(12) United States Patent
Morin

(10) Patent No.: US 8,833,239 B2
(45) Date of Patent: Sep. 16, 2014

(54) COFFEE MACHINE

(75) Inventor: Gilles Morin, Varois et Chaignot (FR)

(73) Assignee: SEB SA, Ecully (FR)

( * ) Notice: Subject to any disclaimer, the term of this patent is extended or adjusted under 35 U.S.C. 154(b) by 772 days.

(21) Appl. No.: 13/125,981

(22) PCT Filed: Oct. 26, 2009

(86) PCT No.: PCT/FR2009/052053
§ 371 (c)(1),
(2), (4) Date: Jun. 3, 2011

(87) PCT Pub. No.: WO2010/049631
PCT Pub. Date: May 6, 2010

(65) Prior Publication Data
US 2011/0226131 A1    Sep. 22, 2011

(30) Foreign Application Priority Data

Oct. 28, 2008  (FR) ..................... 08 57344

(51) Int. Cl.
*A47J 31/40*  (2006.01)
*A47J 31/36*  (2006.01)
*A47J 31/42*  (2006.01)

(52) U.S. Cl.
CPC .......... *A47J 31/3614* (2013.01); *A47J 31/3619* (2013.01); *A47J 31/42* (2013.01)
USPC .......................... 99/286; 99/289 R; 99/302 R

(58) Field of Classification Search
USPC ..................................... 99/286, 289 R, 302 R
See application file for complete search history.

(56) References Cited

U.S. PATENT DOCUMENTS

| 4,681,028 | A | * | 7/1987 | Schmed et al. | ............. 99/289 R |
| 4,970,948 | A | * | 11/1990 | Giannelli | ........................ 99/280 |
| 5,174,194 | A | * | 12/1992 | Piana | .............................. 99/286 |
| 5,367,947 | A | * | 11/1994 | Lussi et al. | ...................... 99/287 |
| 5,845,561 | A | * | 12/1998 | Chigira et al. | .................. 99/286 |
| 5,957,033 | A | * | 9/1999 | In-Albon | ........................ 99/284 |
| 7,370,572 | B2 | * | 5/2008 | De'Longhi | .................. 99/302 P |
| 2008/0190297 | A1 | * | 8/2008 | Gussmann et al. | ............. 99/280 |

FOREIGN PATENT DOCUMENTS

| DE | 1292814 | 4/1969 |
| EP | 0608804 A1 | 8/1994 |
| GB | 2008394 A | 6/1979 |
| NL | 7103079 | 9/1971 |
| WO | 8701570 A1 | 3/1987 |

* cited by examiner

*Primary Examiner* — Reginald L Alexander
(74) *Attorney, Agent, or Firm* — Harness, Dickey & Pierce, PLC

(57) ABSTRACT

The invention relates to a coffee machine (1) including a ground coffee dispensing device (3), a percolating device (4) and a tray for recovering coffee grounds (5). According to the invention, shown in a section along the horizontal plane, the ground coffee dispensing device (3), the percolating device (4) and the recovery tray (5) are arranged in three areas (22, 23, 24) with a substantially rectangular shape and contiguous to one another, a first area with a vessel (22) for the recovery tray (5) and a second vessel (15), a second percolation area (23) for the percolating device (4), and a third adjoining area (24) for the ground coffee dispensing device (3).

17 Claims, 5 Drawing Sheets

COFFEE MACHINE

The present invention relates to a coffee machine for producing liquid coffee by percolating ground coffee compressed by the machine.

An apparatus for preparing drink coffee from capsules containing ground coffee is known, the apparatus allowing water, generally pressurized water, to transpierce these capsules and thus to provide drink coffee. The disadvantage of such an apparatus being the choice in terms of ground coffee, limited to the capsules the apparatus is able to use.

Consequently, there exist coffee machines making it possible to deliver drink coffee from bulk ground coffee, the advantage being the great choice in terms of ground coffee, in particular if the user of the machine buys coffee from a coffee roaster. Such a coffee machine comprises a device for delivering ground coffee, a percolation device and a coffee grounds collecting tray.

Obviously, the disadvantage of such a machine is its encumbrance, in particular owing to the presence of the percolation device which comprises a compression device for compressing bulk ground coffee, and, possibly, owing to the presence of an embedded coffee container for feeding the delivery device with ground coffee.

Thus, the present invention aims at providing a coffee machine with reduced encumbrance, mainly in the width direction (the horizontal dimension of the front face of the machine) and possibly in the depth direction (horizontal dimension perpendicular to the width direction), and even in the height direction.

According to the invention, cut along a horizontal plane, the ground coffee supply device, the percolation device and the coffee grounds collecting tray of the coffee machine are arranged in three areas of substantially rectangular shape and joined to each other, a first tank receiving area accommodating the coffee grounds collecting tray and a second tank, a second percolation area accommodating the percolation device, and a third subsidiary area accommodating the ground coffee supply device.

The width of such a machine is particularly reduced. Thus, whereas a standard machine exhibits a width at least equal to 230 mm, that of a machine in accordance with the present invention is approximately of 200 mm, even of approximately 170 mm according to the more precise arrangement of the three rectangular areas between each other.

Other characteristics and advantages of this invention will become more apparent from the following description of three embodiments given by way of a nonrestrictive example and illustrated in the accompanying drawings in which.

Figure 1:
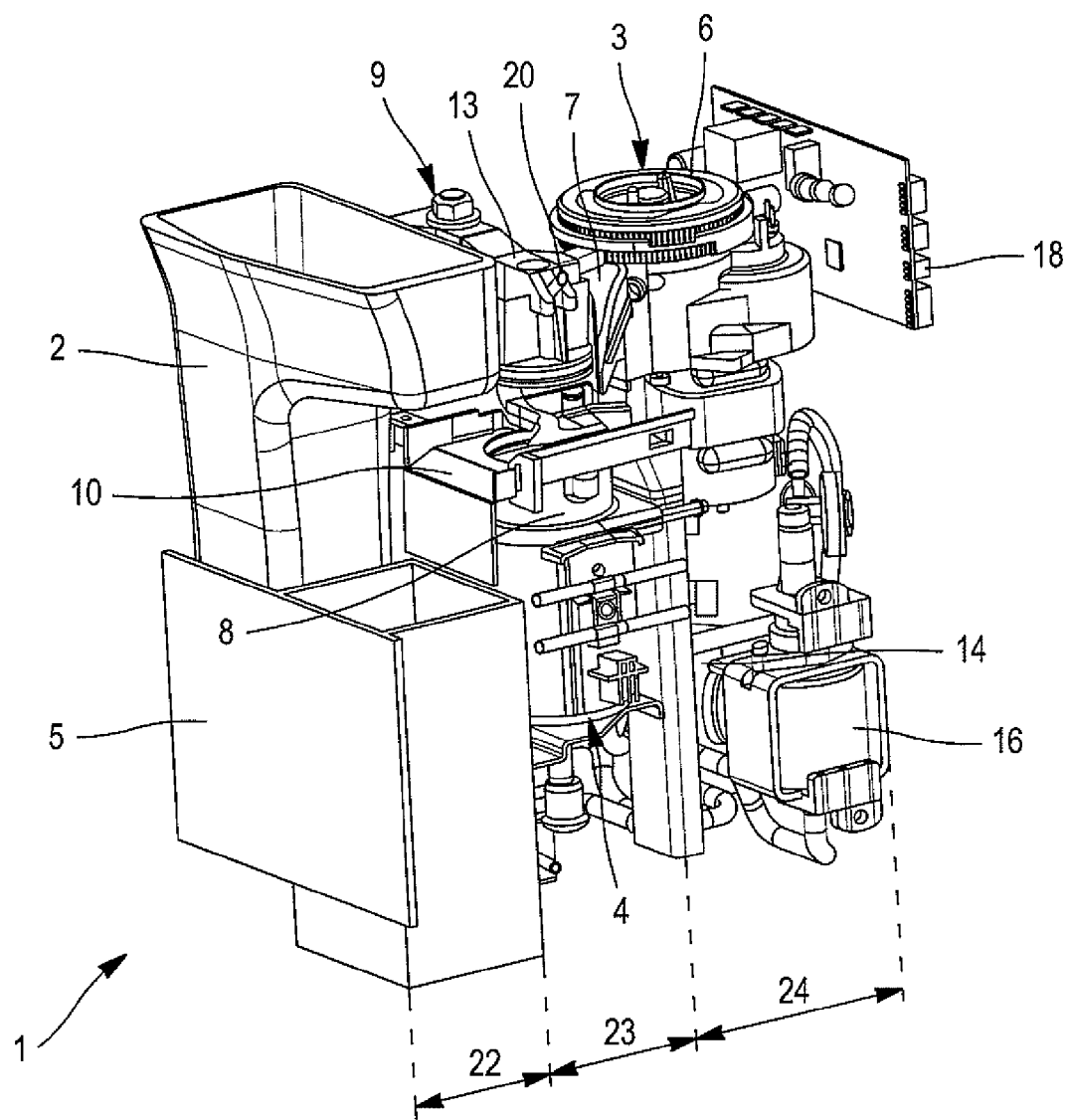
FIG. 1 is a perspective side view of a coffee machine according to a first embodiment of the invention, without its body elements.

As can be seen from the various figures, a coffee machine 1 comprises a water tank 2, a ground coffee supply device 3, a percolation device 4 adapted to produce drink coffee from the ground coffee and a coffee grounds collecting tray 5.

In order to facilitate its filling, the water tank 2 is removable. Moreover, it is shaped such as to be able to receive a water treatment cartridge.

Likewise, in order to facilitate its discharge, the collecting tray 5 is removable.

In addition, in the present embodiments, the ground coffee supply device 3 comprises a coffee mill 6 which is adapted to grind coffee in beans and to deliver doses of ground coffee to the percolation device 4. Although not shown, in the three embodiments, the ground coffee supply device 3 also comprises a container, for containing coffee grains, which is here disposed above the coffee mill so that the coffee grains fall directly into mill 6. Moreover, the coffee machine 1 comprises a chute 7 which is adapted to transfer, by gravity, the doses of ground coffee from the coffee mill 6 to the percolation device 4.

Moreover, in these embodiments, the percolation device 4 comprises a heater adapted to heat water from the water tank 2, an infusion room 8 for receiving ground coffee from the ground coffee supply device 3 and warm water from the heater and to produce drink coffee, a compression device 9 adapted to compress the ground coffee in the infusion room 8, and an ejection device for ejecting the coffee grounds out of the infusion room 8.

More specifically, in these embodiments, the infusion room 8 is disposed above the heater. The infusion room 8 comprises an upper opening for introducing the ground coffee and ejecting the coffee grounds. Here, chute 7 extends from the output aperture of coffee mill 6 to the upper opening of infusion room 8.

Moreover, the ejection device comprises an ejecting piston movable between an infusion position in which the infusion of the coffee is carried out, and an ejection position. Here, the ejecting piston is formed by the bottom wall of infusion room 8 (the wall facing the upper opening). In the ejection position, the ejecting piston is disposed at this opening. Moreover, the ejection device comprises an ejecting finger movable between a rest position and an ejection position.

When the ejecting position is in its ejection position, the displacement of the ejecting finger from its rest position to its ejection position makes it possible to scrape the ejecting position and to discharge the coffee grounds from percolation device 4. In this case, the coffee machine 1 comprises a discharge slide 10 which is adapted to transfer by gravity the coffee grounds from the percolation device 4 to the coffee grounds collecting tray 5 (more precisely, the ejecting finger is adapted to take the scraped coffee grounds to slide 10).

Moreover, the compression device 9 comprises a compressing piston 11 which is assembled movable between an input position where ground coffee can to be introduced into the infusion room 8 and the coffee grounds ejected therefrom, and a compression position where the ground coffee is compressed therein. Here, the compressing piston 11 is disposed above and remote from the upper opening of the infusion room 8. In addition, the compression device 9 also comprises a hydraulic jack 12 adapted to drive movement of the compressing piston 11 from one of its positions to the other and to compress the ground coffee. Here, the hydraulic jack 12 is disposed beside infusion room 8. In this case, the compressing piston 11 is fixedly attached to the shaft of the hydraulic jack 12 by a connecting bar 13. Thus, when the shaft is in a deployed position, the compressing piston 11 is in the input position, and when it is in a retracted position in the cylinder of the hydraulic jack 12, the compressing piston 11 is in the compression position. In this case, the hydraulic jack 12 has a single effect in the direction of retracting the shaft (and thus in the direction of compressing the ground coffee), the coffee machine 1 including a return device connecting cylinder 13 to the shaft in order to allow a return of the shaft in the deployed position upon the pressure in the cylinder falling under a limit value.

In present embodiments, the hydraulic jack 12 is actuated by water contained in the water tank 2. To this end, the coffee machine 1 comprises a water delivery device 14 for selectively distributing water to the heater and the hydraulic jack 12. Moreover, machine 1 also comprises a collecting tank 15 for receiving residual water contained in the water circuit of the heater.

Finally, the coffee machine 1 also comprises a pump 16 for picking-up water from the water tank 2 and delivering pressurized water to the infusion room 8 (as well as to the hydraulic jack 12) via water delivery device 14. It also comprises a flowmeter 17 for regulating the volume of water introduced into the infusion room 8, and an electronic board 18 for controlling the various parts of the coffee machine.

Figure 2:
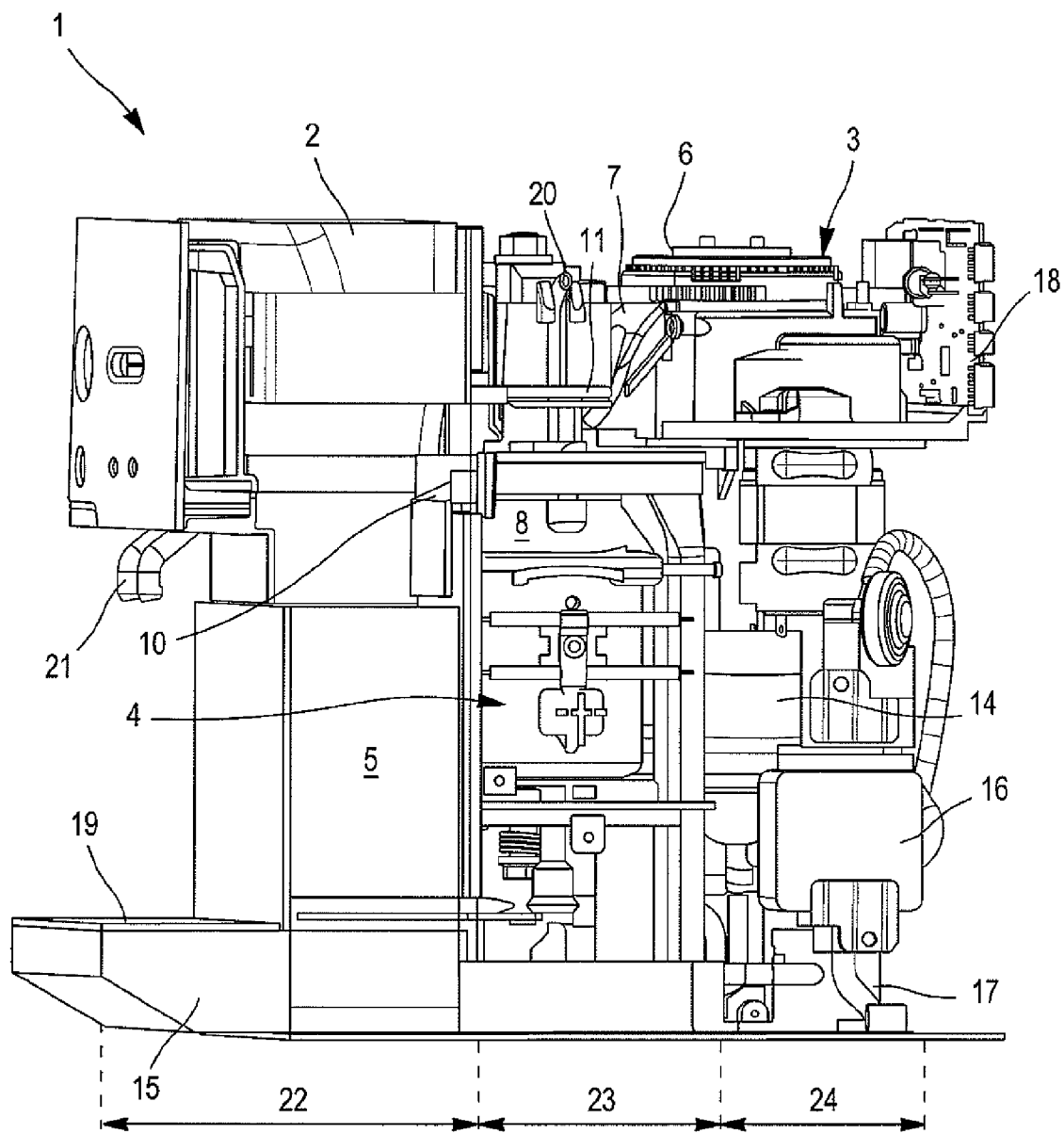
FIG. 2 is a view similar to FIG. 1, some body elements of the coffee machine according to the first embodiment being represented.
Figure 3:
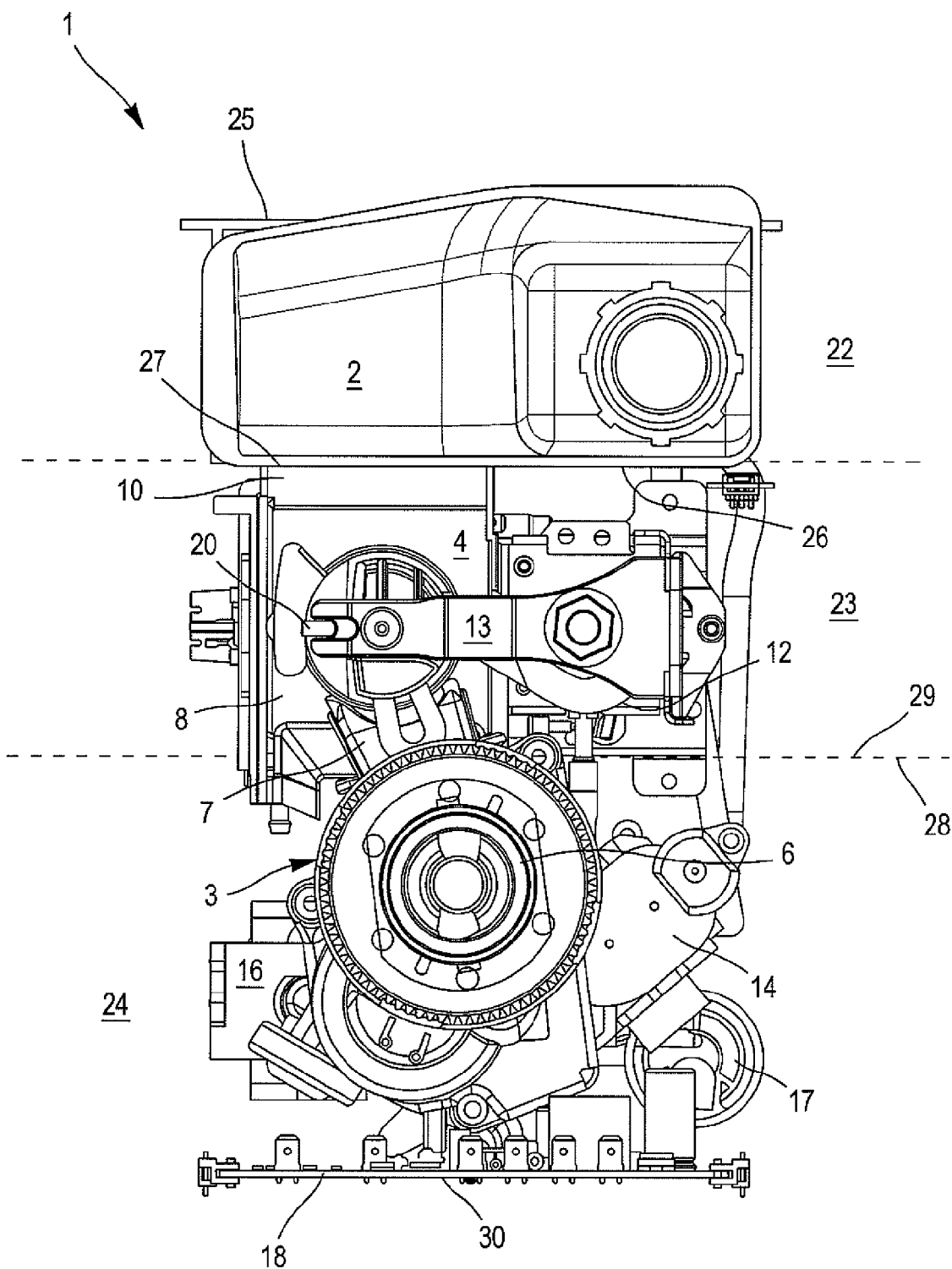
FIG. 3 is a top view of the coffee machine according to the first embodiment.
Figure 4:
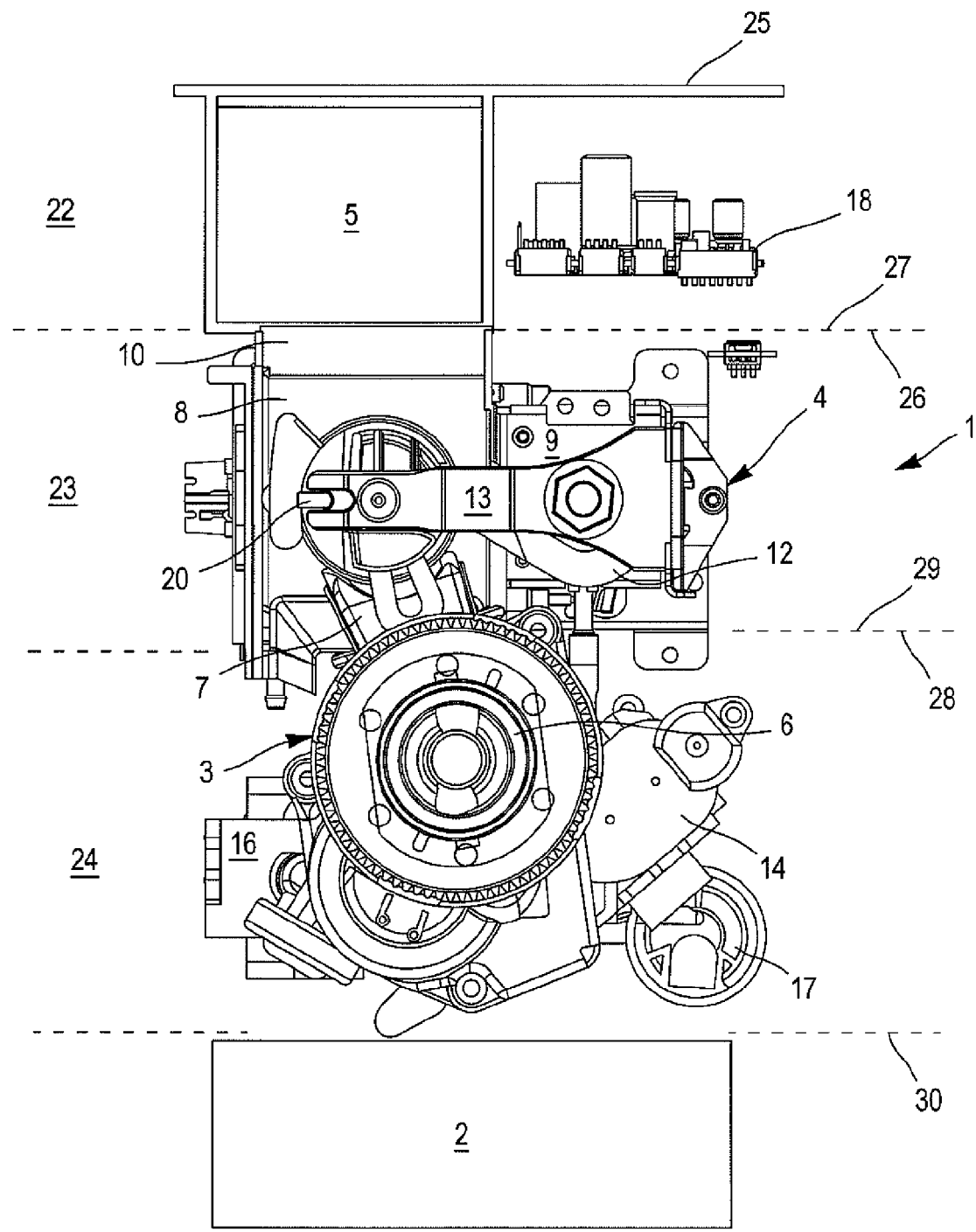
FIG. 4 is a top view of the coffee machine according to a second embodiment, similar to FIG. 3.
Figure 5:
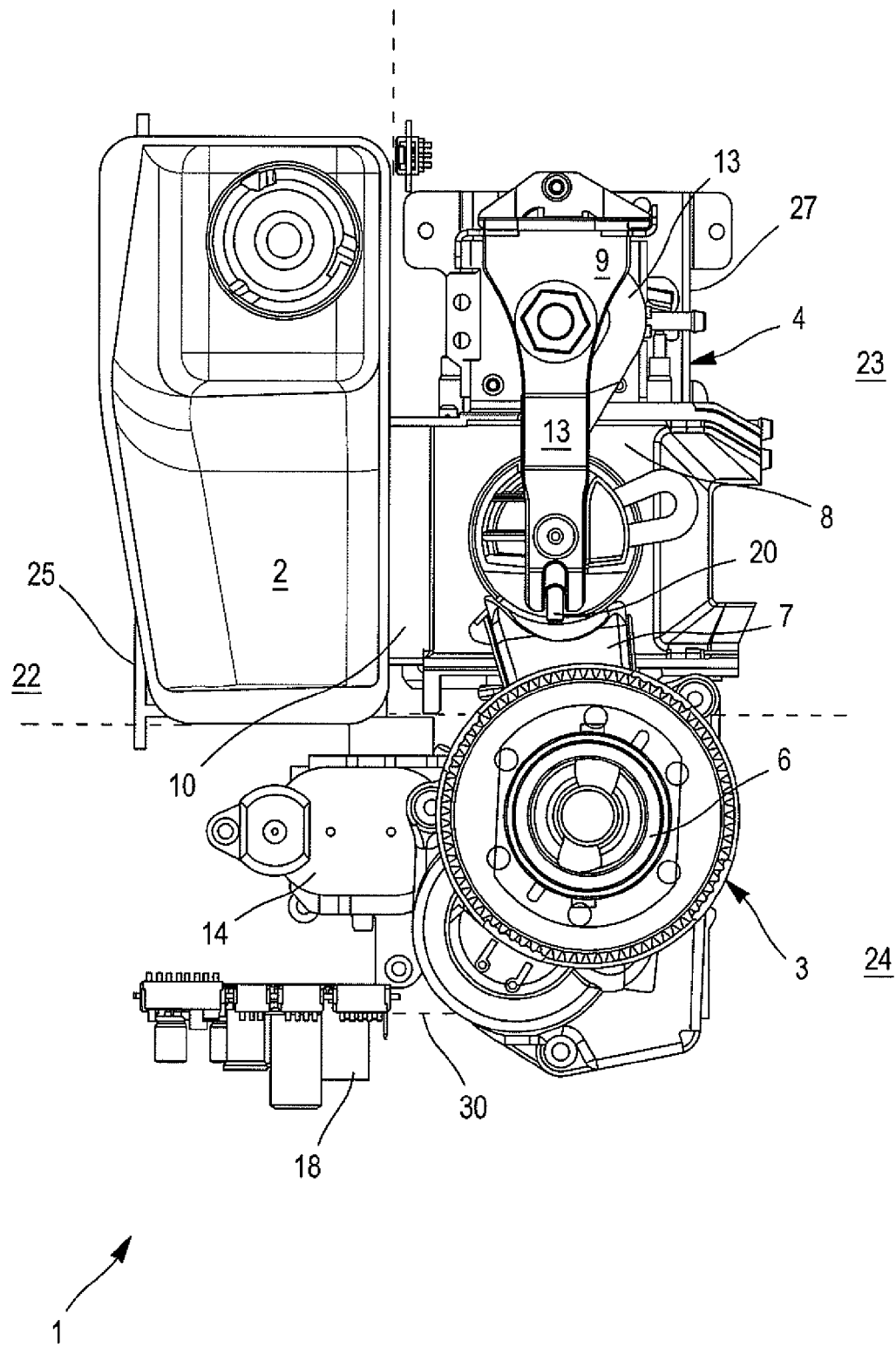
FIG. 5 is a top view of the coffee machine according to a third embodiment, similar to FIGS. 3 and 4.

In use, after startup of the coffee machine 1 and after depositing a cup on the cup holder 19 (cf. FIG. 2) formed by the upper surface of the collecting tank 15, the ground coffee supply device 3 provides a dose of ground coffee (typically between 6 and 12 g according to the selected receipt) to the percolation device 4. More specifically, the coffee mill 6 grinds a dose of coffee grains, the ground coffee being then taken by gravity to the infusion room 8 via chute 7 (the compressing piston 7 being in its input position, leaving the upper opening non obstructed). Then, pump 16 provides pressurized water (up to 15 bars, and even more) to the hydraulic jack 12, via water delivery device 14 of which only the path connected to the jack is open. Thus, the shaft retracts in cylinder 13 and the compressing piston 11 descends in the infusion room 8 and compresses the ground coffee therein. Once the compression reached, the water delivery device 14 is activated so that the path thereof connected to the jack closes (thus holding the pressure in cylinder 13) and the path thereof connected to the heater opens. Consequently, pressurized water is heated and injected into the infusion room 8 (at the bottom wall thereof), crosses the coffee grinding and leaves by a discharge conduit 20 provided in the compressing piston 11 to a coffee nozzle 21 located above the cup holder 19. Once the drink prepared, pump 16 is stopped, the state of the water delivery device 14 again changes allowing the purge of the heater water circuit towards the collecting tank 15. Following a few seconds, the state of water delivery device 14 changes once again and allows water contained in hydraulic jack 12 to return to the water tank 2. The scent of the compressing piston 11 also causes, by a set of cams, the ascent of the ejecting piston to the ejection position thereof, then the displacement of the ejecting finger which pushes the coffee grounds in the collecting tray 5 via the discharge slide 10.

According to the invention, in order to minimize the encumbrance of the machine 1, cut along a horizontal plane, the water tank 2, the ground coffee supply device 3, the percolation device 4 and the collecting tray 5 are arranged in three areas of a substantially rectangular shape and joined to each other, a first tank area 22 for the collecting tray 5 (as well as, in these examples, for the collecting tank 15, and, in the first and third examples, the water tank 2), a second percolation area 23 for the percolation device 4 (i.e. the heater, the infusion room 8, the compression device 9 and the ejection device), and a third subsidiary area 24 for the ground coffee supply device 3 (as well as, in these examples, for the water delivery device 14, pump 16, flowmeter 17 and electronic board 18).

Preferably, in order to facilitate the access to the various tanks, the tank area 22 opens on the front face of the machine 1, and the subsidiary area 24, especially when it comprises a coffee mill 6, which is particularly noisy, opens onto the rear side.

In the first and second embodiments, the tank area occupies the totality of the front face of the machine 1. This tank area 22 is directed so that a first 25 of its two longest sides 25, 26 extends along the front face. Then, the percolation area 23 is located behind the tank area 22 and is directed so that a first 27 of its two longest sides 27, 28 extends along the second 26 of the two longest sides 25, 26 of the tank area 22. Finally, the subsidiary area 24 is located behind the percolation area 23 and is directed so that a first 29 of its two longest sides 29, 30 extends along the second 28 of the two longest sides 27, 28 of the percolation area 23. Thus, the three rectangular areas 22, 23, 24 are joined to one another, along the same orientation (their identical length being equal to the width of the machine 1).

Moreover, in the first preferred embodiment, the water tank 2 is disposed in the tank area 22, above the collecting tray 5. In this embodiment, the second 30 of the two longest sides 29, 30 of the subsidiary area 24 extends along the rear face of machine 1. Thus, the sum of the three widths of the three areas is equal to the depth of machine 1.

In this embodiment, the width of machine 1 is lower than 170 mm and its depth lower than 310 mm.

In the second embodiment, for esthetic reasons the water tank 2 is disposed in a fourth dedicated area, following the subsidiary area 24. In this embodiment, the width of the machine remains lower than 170 mm, but its depth increases by 30 mm compared to that of the first embodiment.

In the third embodiment, the tank area 22 and the percolation area 23 each occupy about half of the front face of the machine 1. These two areas 22, 23 are directed so that, for each area 22, 23, a first 25, 27 of their two longest sides extends along the two side faces of the machine 1. The subsidiary area 24 is located behind the tank area 22 and the percolation area 23 and is directed so that one 30 on its two longest sides extends along the rear face of the machine. In this embodiment, the depth of the machine remains lower than 310 mm, but its width is increased by 30 mm with respect to those of the first and second embodiments.

The present invention is not limited to these three embodiments.

For instance, the ground coffee supply device, instead of comprising a mill associated with a grain coffee tray, could be formed by a ground coffee tray whose coffee discharge opening may be controlled by the computer system of the machine so as to deliver coffee doses.

The invention claimed is:

1. A coffee machine comprising a cup holder on which a cup can be placed, said cup holder being disposed on a front face of said coffee machine, said front face extending in a width direction, said coffee machine having a depth direction perpendicular to said width direction and a vertical direction in use wherein the cup is placed on the cup holder which is perpendicular to said depth and width directions, said coffee machine including a ground coffee supply device, a percolation device and a coffee grounds collecting tray wherein, along a horizontal plane perpendicular to said vertical direction, the ground coffee supply device, the percolation device and the coffee grounds collecting tray are arranged in three areas of a substantially rectangular shape and appended to each other, a first tank area for the coffee grounds collecting tray and a second tank, a second percolation area for the percolation device, and a third subsidiary area for the ground coffee supply device.

2. A coffee machine according to claim 1, wherein the second tank is formed by a waste water collecting tank, said second tank having an upper surface which forms said cup holder.

3. A coffee machine according to claim 1, wherein a third tank is disposed in the tank area.

4. A coffee machine according to claim 3, wherein the third tank is formed by a water tank.

5. A coffee machine according to claim 1, wherein the subsidiary area opens at the rear face of the machine opposed to the front face.

6. A coffee machine according to claim 1, wherein the tank area opens at the front face of the machine.

7. A coffee machine according to claim 6, wherein the tank area and the percolation area each occupy about half the front face of the machine, each of these two areas being directed in order to be contiguous to one another and to have one of their two longest sides extending along a side face of the machine.

8. A coffee machine according to claim 7, wherein the subsidiary area is located behind the tank area and the percolation area and is directed so that one of its two longest sides extends along the rear face of the machine.

9. A coffee machine according to claim 6, wherein the entire front face of the machine is occupied by the tank area directed so that a first of its two longest sides extends along the front face of the machine.

10. A coffee machine according to claim 9, wherein the percolation area is located behind the tank area and is directed so that a first of its two longest sides extends along the second of the two longest sides of the tank area.

11. A coffee machine according to claim 10, wherein the subsidiary area is located behind the percolation area and is directed so that a first on its two longest sides extends along the second of the two longest sides of the percolation area.

12. A coffee machine according to claim 11, wherein the second of the two longest sides of the subsidiary area extends along the rear face of the machine.

13. A coffee machine according to claim 11, wherein it comprises a water tank appended to the second of the two longest sides of the subsidiary area.

14. A coffee machine according to claim 1, wherein it comprises a pump which is adapted to deliver pressurized water in the percolation device and which is disposed in the subsidiary area.

15. A coffee machine according to claim 1, further comprising a flowmeter which is adapted to control the volume of water introduced into the percolation device and which is disposed in the subsidiary area.

16. A coffee machine according to claim 1, further comprising an electronic board for controlling the various parts of the coffee machine and which is disposed in the subsidiary area.

17. A coffee machine according to claim 1, further comprising a water delivery device which is adapted to selectively deliver water to a heater as part of the percolation device and adapted to heat water before introducing the same into an infusion room of the percolation device, and towards a hydraulic jack forming part of the percolation device and adapted to compress the ground coffee in the infusion room, the water delivery device being disposed in the subsidiary area.

* * * * *